June 30, 1953 A. J. COSMETTO 2,643,850
STOPCOCK MECHANISM
Filed July 29, 1949
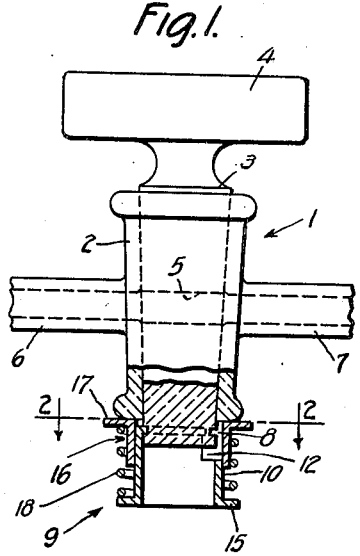
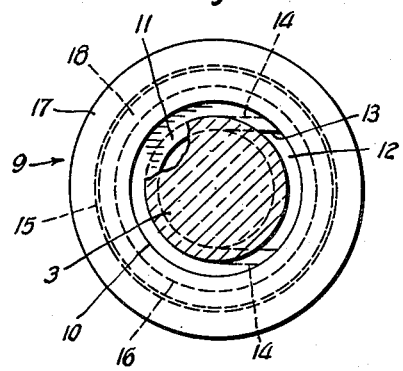
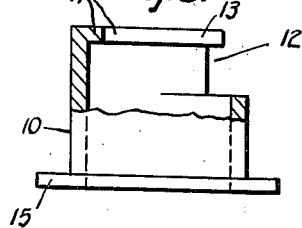
INVENTOR.
Aristodeme J. Cosmetto
BY
*Mosier, Nolte, Crews + Berry*
ATTORNEYS Patented June 30, 1953

2,643,850

UNITED STATES PATENT OFFICE 2,643,850

STOPCOCK MECHANISM

Aristodeme J. Cosmetto, White Plains, N. Y.

Application July 29, 1949, Serial No. 107,588

3 Claims. (Cl. 251—112)

This invention relates to valve mechanisms and more particularly to stop cocks of the kind wherein a tapered stem is rotatably mounted in a tapered seat member and is provided with one or more transverse passages for controlling communication of laterally extending conduits with one another.

In such stop cocks the tapered stem is usually provided at its larger end with an operating handle, and at its lower, protruding end with a circumferential groove. A rubber washer caught in the groove bears against the lower end of the tapered seat member and exerts a slight yielding force tending to urge the stem to seated position. The rubber washer is of some slight assistance in maintaining the stopcock seated, but it is incapable of exerting any substantial longitudinal thrust. The rubber washer is of little assistance in preventing the stop cock from blowing out when abnormal pressure occurs.

It is the primary object of this invention to provide a spring device which may be substituted for the rubber washer, which will act with far greater force and effectiveness than the washer in maintaining the stem seated, and will also positively prevent the stop cock from blowing out.

The novel seating device enables fluids to be transmitted while confined in a leak-proof manner at substantially higher pressures than can be handled when the rubber washer is employed.

To the end referred to, it is a feature of the invention that a spring device is made to comprise an inner sleeve having an inturned flange at its upper end engageable in the circumferential groove of the stem and an outturned flange at its lower end, an outer sleeve slidable upon the inner sleeve and having an outturned flange at its upper end engageable with the lower end of the seat member, and a compression coil spring surrounding the sleeves and bearing against the outturned flanges of the inner and outer sleeves for urging them away from one another.

It is a further feature of the invention that the outer sleeve normally covers a cut away or entrance mouth formed in one side of the upper end of the inner sleeve to prevent lateral withdrawal of the device from the stem, but that the outer sleeve is displaceable downward far enough to clear the stem and permit lateral withdrawal of the device when desired.

Other objects and advantages will hereinafter appear.

In the drawing forming part of this specification

Fig. 1 is a fragmentary view in front elevation, partly in section, showing a stop cock with the novel spring seating device applied to it;

Fig. 2 is a sectional view taken upon the line 2—2 of Fig. 1 looking in the direction of the arrows, the view being upon a substantially larger scale than Fig. 1; and Fig. 3 is a detailed view in elevation partly broken away, of the inner sleeve member employed in the spring device.

In this specification the terms "upper" and "lower" are purely relative terms descriptive of the relation of the parts in some but not all of the attitudes in which the strucure could be placed.

The illustrative stop cock 1 is of conventional construction. It comprises a tapered glass seat member 2 in which a tapered glass stem 3 is rotatably mounted. The stem is desirably formed integral with an operating handle 4, and is formed intermediate its ends with a transverse passage 5. As shown in Fig. 1, the passage 5 aligns with a pair of diametrically opposed side conduits 6 and 7 which are unitary with the seat member 2. As is well understood, the stem when in the position shown in Fig. 1, places the conduits 6 and 7 in communication with one another. The stem 3 may be turned, however, to interrupt and to re-establish communication between the conduits 6 and 7 at will.

The stem 3 protrudes below the lower end of the seat member 2 and has a circumferential groove 8 formed in the lower protruding end portion. A spring device 9 is applied to the stem for urging the stem downward relative to the seat member 2 and thereby producing and maintaining a substantially leak-proof joint and securely guarding the stop cock against blowing out.

The spring device 9 comprises an inner sleeve member 10 which has an inturned flange 11 formed at its upper end for engaging in the groove 8 of the stem. The upper end of the sleeve 10 is formed with a side opening 12 for enabling the sleeve 10 to be slipped laterally into position on the stem 3 with the flange 11 lodged in the groove 8. In forming the side opening the flange 11 is cut away along parallel lines 13 which extend tangent to the inner edge of the flange at diametrically opposite points. The unflanged wall of the sleeve is similarly cut away along parallel lines 14 which extend tangent to the inner face of the sleeve at diametrically opposite points. The lines 13 and 14 are parallel or substantially parallel to one another. The sleeve 10 is provided at its lower end with an outturned flange 15.

An outer sleeve 16 is slidably mounted upon the inner sleeve 10. The sleeve 16 is provided with an outturned flange 17 at its upper end which is engageable with the lower end of the seat member 2. A compression coil spring 18 surrounds the outer and inner sleeves and bears against the flanges 15 and 17 to urge them yieldingly away from one another. The tendency of the spring is to move the outer sleeve upward and the inner sleeve downward relative to one another. Since the outer sleeve, however, is engaged and arrested by the lower end of the seat member 2 and since the stem 3 must move in unison with the inner sleeve 10, the effect of the spring 18 is to force the stem 3 downward relative to the seat member 2 and hold it firmly but yieldingly seated at all times.

The upper sleeve 16 normally covers the side opening 12 of the inner sleeve and prevents lateral withdrawal of the spring device 9 from the stem 3. When it is desired to withdraw the spring device laterally, however, the outer sleeve 16 may be forced downwardly into position to clear the lower end of the stem 3, whereupon lateral withdrawal of the device 9 may be effected.

I have described what I believe to be the best embodiments of my invention. I do not wish, however, to be confined to the embodiments shown, but what I desire to cover by Letters Patent is set forth in the amended claims.

I claim:

1. A device for urging a tapered stop cock stem having a circumferential groove formed at the lower end thereof to seated position in a tapered stop cock seat member comprising, in combination, an inner sleeve provided with an inturned flange at its upper end for engagement in the circumferential groove of the stem, the upper end of said inner sleeve being cut away at one side to enable the flange to be inserted laterally in the stem groove, the inner sleeve also having an outturned flange at its lower end, an outer sleeve slidingly mounted upon the inner sleeve and engageable with the stop cock seat member, said outer sleeve having an outturned flange which overlies the outturned flange of the inner sleeve, and a compression coil spring disposed around the sleeves between the outturned flanges to urge said flanges apart.

2. A device for urging a tapered stop cock stem to seated position in a tapered stop cock seat member comprising, in combination, an inner sleeve provided with an inturned flange at its upper end for engagement in a circumferential groove formed in the lower end of the stem, the upper end of said inner sleeve being cut away at one side to enable the flange to be inserted in the groove, the inner sleeve also having an outturned flange at its lower end, an outer sleeve slidingly mounted upon the inner sleeve and having an outturned flange at its upper end engageable with the lower end of the seat member, and a compression coil spring disposed around the outer and inner sleeves between the outturned flanges thereof to urge said flanges apart, the outer sleeve normally covering the side opening at the upper end of the inner sleeve and serving to prevent lateral withdrawal of the device from the stem, but being displaceable downward far enough to clear said side opening and the stem when it is desired to withdraw the device laterally from the stem.

3. In a spring device for use with a stop cock having a tapered stem portion rotatably mounted in a tapered seat member and having a circumferential groove formed in the protruding lower end portion thereof; said device comprising an inner sleeve provided with an inturned flange at its upper end for engagement in the circumferential groove, the upper end of said inner sleeve being cut away at one side to enable the flange to be inserted in the stem groove, the inner sleeve also having an outturned flange at its lower end, an outer sleeve slidingly mounted upon the inner sleeve and having an outturned flange at its upper end engageable with the lower end of the seat member, and a compression coil spring disposed around the outer and inner sleeves between the outturned flanges thereof to urge said flanges apart, the outer sleeve normally covering the side opening at the upper end of the inner sleeve and serving to prevent lateral withdrawal of the device from the stem, but being displaceable downward far enough to clear said side opening and the stem when it is desired to withdraw the device laterally from the stem.

ARISTODEME J. COSMETTO.

References Cited in the file of this patent

UNITED STATES PATENTS

| Number | Name | Date |
|---|---|---|
| 1,222,172 | Wray | Apr. 10, 1917 |
| 1,357,608 | Blackmore | Nov. 2, 1920 |
| 1,835,019 | Dawson | Dec. 8, 1931 |

FOREIGN PATENTS

| Number | Country | Date |
|---|---|---|
| 20,292 | Great Britain | of 1906 |

OTHER REFERENCES

Analytical Chemistry, published by American Chemical Society.